(12) United States Patent
Hadar

(10) Patent No.: US 7,537,222 B2
(45) Date of Patent: May 26, 2009

(54) COMBINATION DOLLY-PALLET

(75) Inventor: Nir Hadar, Kalmthout (IL)

(73) Assignee: Polymer Logistics (Israel) Ltd., Raanana (IL)

( * ) Notice: Subject to any disclaimer, the term of this patent is extended or adjusted under 35 U.S.C. 154(b) by 0 days.

(21) Appl. No.: 12/058,806

(22) Filed: Mar. 31, 2008

(65) Prior Publication Data

US 2008/0238010 A1 Oct. 2, 2008

Related U.S. Application Data

(63) Continuation of application No. 11/221,714, filed on Sep. 9, 2005, now abandoned.

(51) Int. Cl.
*B62D 61/12* (2006.01)
(52) U.S. Cl. .................. 280/43.12; 280/43.17
(58) Field of Classification Search .............. 280/763.1, 280/43.17, 43.14, 43.23, 43.24, 47.34, 79.11, 280/43.12; 410/80, 84, 81
See application file for complete search history.

(56) References Cited

U.S. PATENT DOCUMENTS

| | | | | |
|---|---|---|---|---|
| 1,747,972 | A * | 2/1930 | Feldmann | 280/43.24 |
| 2,843,392 | A * | 7/1958 | Simpkins | 280/43.14 |
| 2,964,327 | A * | 12/1960 | Mohr | 280/43.24 |
| 3,216,531 | A | 11/1965 | Hutchinson | |
| 3,247,931 | A | 4/1966 | Bunn | |
| 3,422,929 | A * | 1/1969 | Oja et al. | 280/43.17 |
| 4,016,819 | A | 4/1977 | Cowling | |
| 4,213,624 | A | 7/1980 | Sanders | |
| 4,313,612 | A | 2/1982 | Rubens | |
| 4,471,969 | A | 9/1984 | Zabala et al. | |
| 5,035,445 | A * | 7/1991 | Poulin | 280/79.11 |
| 5,193,828 | A | 3/1993 | Benvenuti | |
| 5,535,465 | A * | 7/1996 | Hannant | 280/43.23 |
| 5,628,522 | A * | 5/1997 | Hall | 280/43.17 |
| 5,819,671 | A | 10/1998 | Ocampo | |
| 5,845,914 | A | 12/1998 | Lenkman | |
| 5,938,217 | A | 8/1999 | Wintz | |
| 5,940,932 | A * | 8/1999 | LaHay | 16/30 |
| 6,109,625 | A * | 8/2000 | Hewitt | 280/43.24 |
| 6,371,496 | B1 * | 4/2002 | Balolia | 280/35 |
| 6,450,515 | B1 | 9/2002 | Guth | |
| 6,843,625 | B2 * | 1/2005 | Hewitt | 280/79.11 |
| 7,040,460 | B1 * | 5/2006 | Sherrill et al. | 188/5 |
| 2001/0040069 | A1 | 11/2001 | Trovato et al. | |
| 2005/0002766 | A1 | 1/2005 | Hartmann et al. | |

FOREIGN PATENT DOCUMENTS

| | | |
|---|---|---|
| EP | 1772390 | 4/2007 |
| GB | 2436553 | 10/2007 |
| GB | 2440802 | 2/2008 |

* cited by examiner

*Primary Examiner*—Hau V Phan
(74) *Attorney, Agent, or Firm*—Mark M. Friedman

(57) ABSTRACT

The dolly-pallet of the present invention includes a load bearing deck that may be alternately supported by the retractable support skid or the wheel elements. Initial displacement of the skid during the retraction process is along an upward substantially vertical path. Once the retractable support skid is retracted such that the dolly-pallet is being supported by the wheel elements, the retractable support skid may be further displaced along an upward substantially arcuate path so as to move it away form the wheel elements, allowing them to swivel if they are so configured. In this way, the center of mass of the load is lowered vertically, thereby reducing stress on the displacement mechanism until the load is supported by the wheel elements.

14 Claims, 21 Drawing Sheets

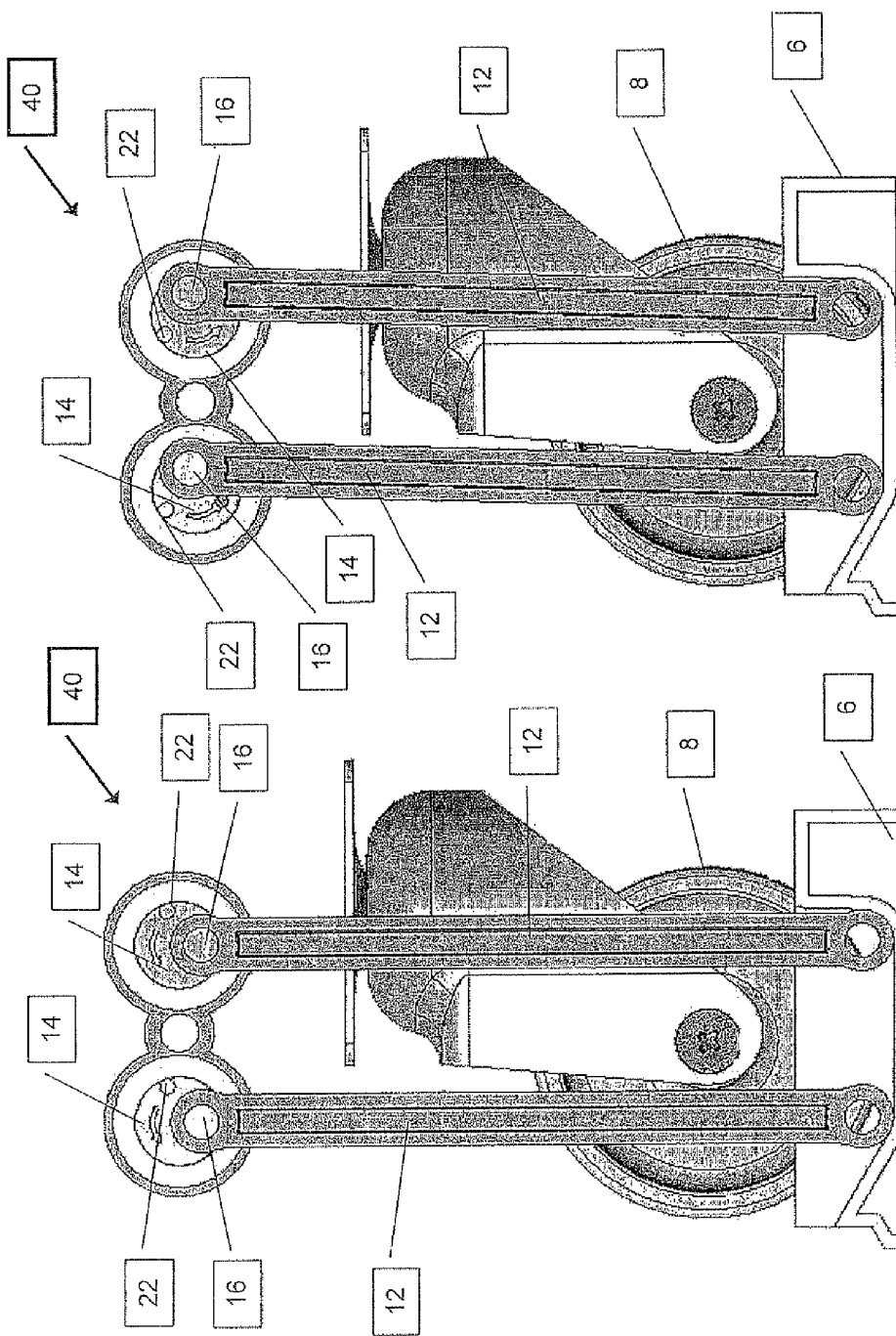

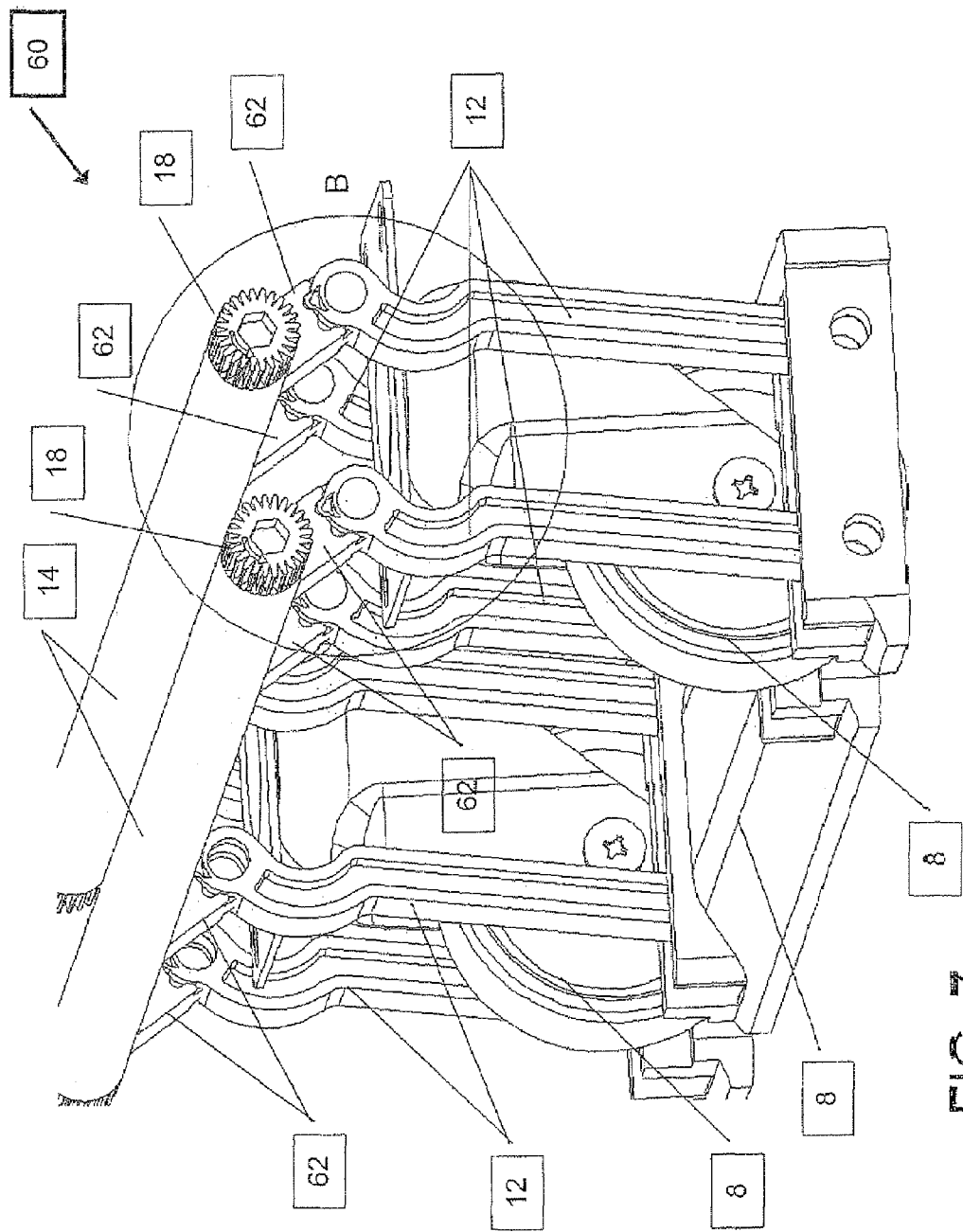

COMBINATION DOLLY-PALLET

This application is a continuation of U.S. patent application Ser. No. 11/221,714 filed Sep. 9, 2005, which is now abandoned.

FIELD AND BACKGROUND OF THE INVENTION

The present invention relates to dollies and pallets and, in particular, it concerns a combination dolly-pallet.

The prior art is replete with wheeled dollies and pallets with retractable wheels. Wheeled dollies, however, are generally not usable on roller conveyer devices, and pallets generally must be lifted off the ground in order to be moved.

One problem with some pallet designs utilizing retractable wheels is that the wheels are fixed to the displacement mechanism rather than directly to the pallet. Therefore, the stresses of moving the loaded pallet are applied to the displacement mechanism rather than to the solid part of the pallet. Reliable devices require heavy displacement mechanisms. Further, the displacement path of the wheel elements includes some degree of lateral displacement while the wheel elements are supporting the full weight of the pallet and its contents. Here again, the stresses of the load are applied to the displacement mechanism rather than to the solid part of the pallet.

There is therefore a need for a combination dolly-pallet with wheels that are fixedly attached and a retractable contact surface that supports the dolly-pallet while in a non-rolling state, wherein the retractable contact surface is displaced along a substantially vertical path. It would be beneficial if the retractable contact surface were configured as a retractable support skid.

SUMMARY OF THE INVENTION

The present invention is a combination dolly-pallet.

According to the teachings of the present invention there is provided, a dolly-pallet device convertible between a pallet condition in which the device is usable as a pallet and a dolly condition in which the device is usable as a dolly, the dolly-pallet device comprising: (a) a deck having a length and a width; (b) at least two skids attached to the deck for supporting the deck on a ground surface when the device is in the pallet condition, each of the skids extending along substantially the entirety of one of the length and the width; and (c) a set of wheels attached to the deck for supporting the deck on the ground surface when the device is in the dolly condition, wherein the skids are movable relative to the deck to convert the dolly-pallet device between the pallet condition and the dolly condition, and wherein, at least in the pallet condition, each of the wheels is deployed substantially within a footprint of one of the skids.

According to a further feature of the present invention, the length is greater than the width, and wherein the skids extend parallel to the width.

According to a further feature of the present invention, the skids are attached to the deck by at least one displacement mechanism.

According to a further feature of the present invention, the displacement mechanism is configured to provide geometrical locking of the skid in the pallet condition, and to be operable to release the geometrical locking and raise the skid to provide the dolly condition.

According to a further feature of the present invention: (a) each of the skids is attached to the deck by a corresponding displacement mechanism; and (b) the displacement mechanisms are mechanically linked so as to be substantially simultaneously operable by a common actuation linkage.

According to a further feature of the present invention, at least one of the wheels is a caster.

According to a further feature of the present invention, the skids are movable to a position in which the caster is free to swivel.

According to a further feature of the present invention, when the device is in the dolly condition, the skids are further displaceable along a substantially arcuate path to a further retracted position.

According to a further feature of the present invention, the skids are configured such that, when the device is supported on the ground surface in the pallet condition, the wheels are clear of the ground surface.

According to a further feature of the present invention, the wheels are attached to the deck in a fixed relation.

There is also provided according to the teachings of the present invention, a method of transporting a load using the aforementioned dolly-pallet device, the method comprising the steps of: (a) with the loaded dolly-pallet device standing on a ground surface in its pallet condition, moving the skids toward the deck so as to convert the dolly-pallet device to the dolly condition; and (b) transporting the dolly-pallet and the load across the ground surface by rolling on the wheels.

According to a further feature of the present invention, prior to the moving, the dolly-pallet device and the load are wholly supported by the skids and the wheels are clear of the ground surface, and during the moving, the deck and the load are lowered relative to the ground surface.

According to a further feature of the present invention, in the moving, the skids move in a direction perpendicular to the ground surface.

According to a further feature of the present invention, after the moving, the skids are further retracted along an arcuate path relative to the deck.

BRIEF DESCRIPTION OF THE DRAWINGS

The invention is herein described, by way of example only, with reference to the accompanying drawings, wherein:

FIG. 4A is a detail of FIG. 4;

FIGS. 6A and 6B are side elevations of the variant of FIG. 6 showing the retractable support skid being retracted vertically;

FIG. 7 is an isometric view of a second preferred embodiment of a displacement mechanism constructed and operative according to the teachings of the present invention, this embodiment utilizing levers to displace the retractable support skid, here the retractable support skid has been lifted vertically;

DESCRIPTION OF THE PREFERRED EMBODIMENTS

The present invention is a combination dolly-pallet.

The principles and operation of combination dolly-pallet according to the present invention may be better understood with reference to the drawings and the accompanying description.

Figure 1:
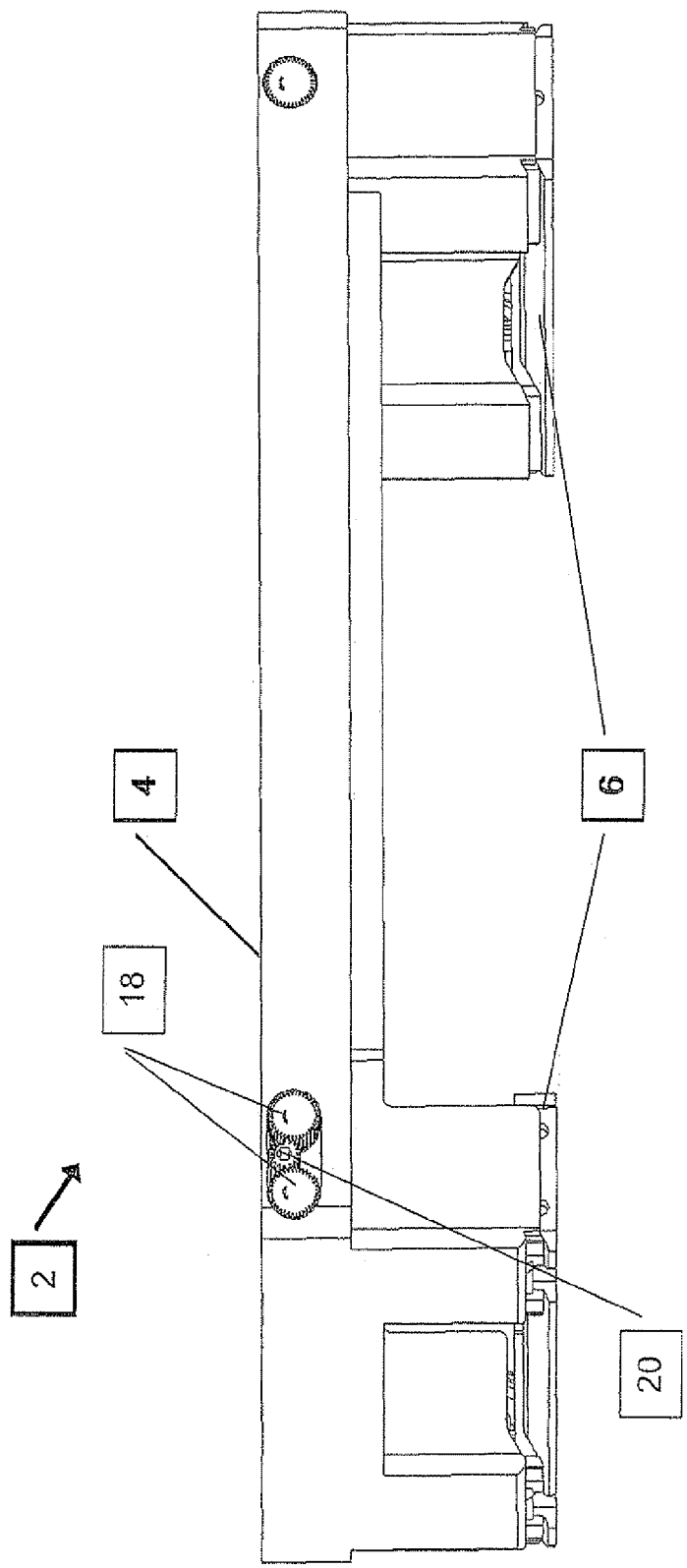
FIG. 1 is a schematic isometric view of a dolly-pallet constructed and operative according to the teachings of the present invention, shown here being supported by the retractable support skids.
Figure 2:
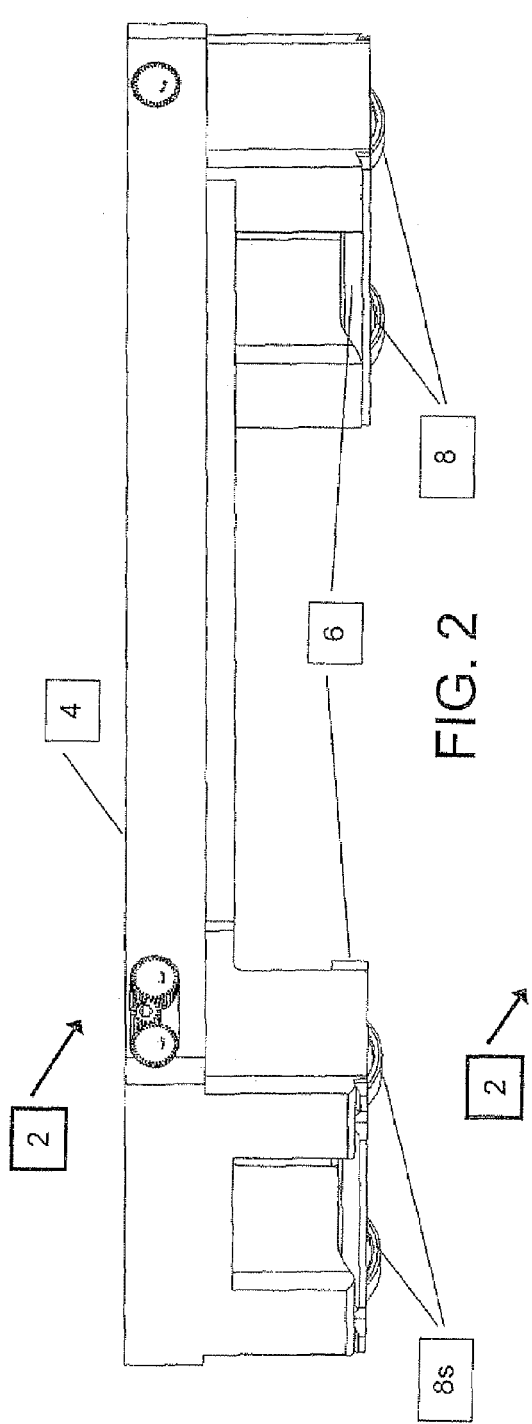
FIG. 2 is a schematic isometric view of the embodiment of FIG. 1, shown here with the retractable support skids retracted vertically.
Figure 3:
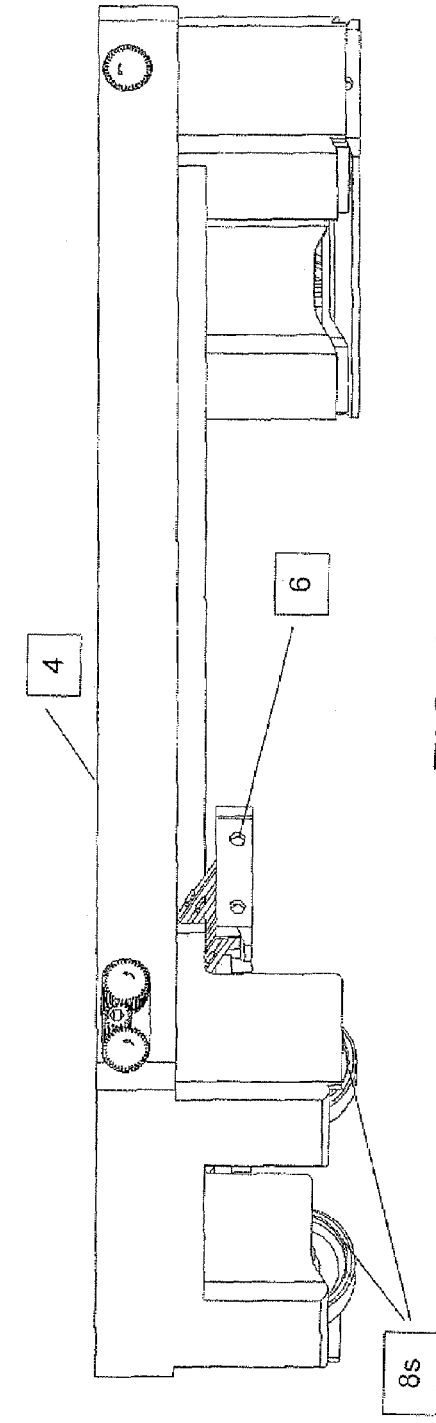
FIG. 3 is a schematic isometric view of the embodiment of FIG. 1, shown here with the retractable support skids displaced along a substantially arcuate path after having been lifted vertically.
Figure 9:
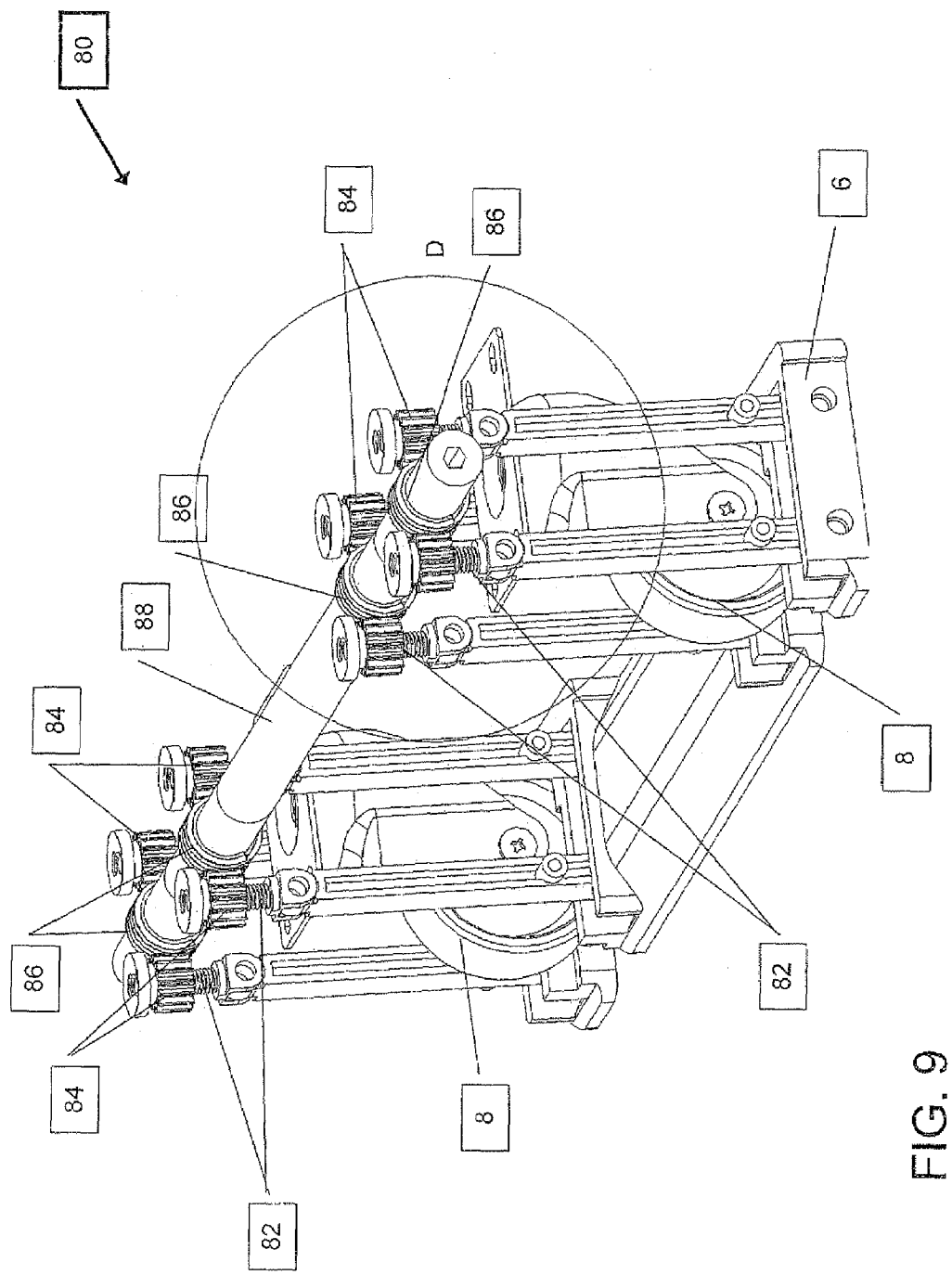
FIG. 9 is an isometric view of a third preferred embodiment of a displacement mechanism constructed and operative according to the teachings of the present invention, this embodiment utilizing worm gears and drive screws to displace the retractable support skid.

By way of introduction, FIGS. 1-3 schematically illustrate a number of the principles of the dolly-pallet 2 of the present invention. According to the teachings of the present invention, the load bearing deck 4 may be alternately supported by the retractable support skid 6 or the wheel elements 8. Further, the displacement mechanism of the present invention provides a substantially locked support state when the load bearing deck 4 may be alternately supported by the retractable support skid 6 such that retractable support skid 6 is substantially locked from vertical displacement (as seen in FIGS. 6A, 7A and 9). Initial displacement of the skid during the retraction process is along an upward substantially vertical path. In this way, the center of mass of the load is lowered vertically, thereby reducing stress on the displacement mechanism, until the load is supported by the wheel elements 8. Once the retractable support skid 6 is retracted such that the dolly-pallet is being supported by the wheel elements 8, the retractable support skid 6 may be further displaced along an upward substantially arcuate path to move it away form the wheel elements 8, allowing them to swivel if they are so configured. Therefore, the two-stage displacement motion preferably corresponds to a high force/torque motion sufficient to the retractable support skid 6 when under load, followed by a low force/torque motion for displacing the unloaded retractable support skid 6 from the region of the wheels along the arcuate path.

It will be appreciated that only some of the wheel elements 8 may be configured to swivel. That is, to rotate about a vertical axis such as, but not limited to, a caster. Therefore, only those retractable support skids 6 associated with swivel wheel elements 8s need be displaced further to allow the swivel wheel elements freedom to swivel. This is illustrated in FIG. 3 where only retractable support skid 6a is displaced away form the wheel elements 8s.

It will be understood that directional terms such as "up," "upward," "down," "downward," "top," "bottom," "clockwise," and "counter-clockwise" are used herein in reference to those directions as they appear in the drawings.

Applying the principles of displacing the retractable support skids 6 first along an upward vertical path and then displacing the retractable support skids 6 further along an upward arcuate path to move it away from the wheel elements 8 may be achieved by any number of displacement mechanisms. Discussed herein are five preferred embodiments offered as examples only. It will be apparent to one of ordinary skill in the art that other displacement mechanisms may be used with equal success. Although the embodiments illustrated herein are directed toward displacement mechanisms and wheel elements that are deployed within an interior volume of a fixed leg portion extending downward from the load bearing deck of the dolly-pallet, this is considered to be a choice of design rather than a limitation, and the principles of the present invention may be applied without such an enclosure.

It should be noted that for ease of understandings displacement mechanism elements that serve the same or similar function in each of the embodiments herein described are numbered the same even though there may be slight differences in their individual configurations.

Figure 4:
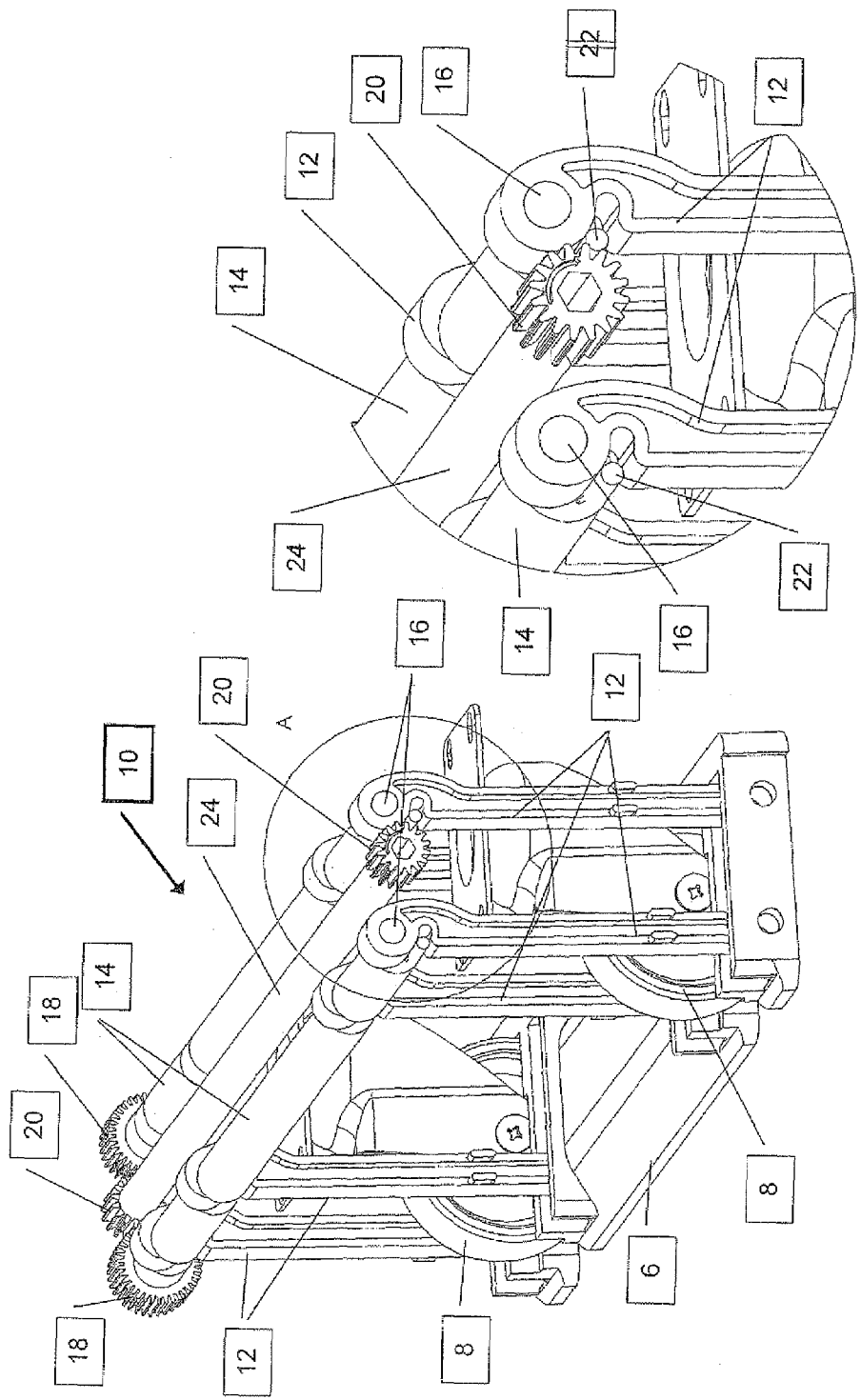
FIG. 4 is an isometric view of a first preferred embodiment of a displacement mechanism constructed and operative according to the teachings of the present invention, this embodiment utilizing eccentric pins for displacing the retractable support skids, here the retractable support skid has been lifted vertically.

Referring now to the drawings, FIG. 4 illustrates a first preferred embodiment of a displacement mechanism 10. In this embodiment, the retractable support skid 6 is retracted and lowered along a substantially vertical path by support struts 12, which are attached to the rotating lifting bars 14 by eccentric attachment shafts 16. The rotating lifting bars 14 are driven by gears 18 that mesh with drive gears 20 deployed on drive shaft 24.

Figure 6:
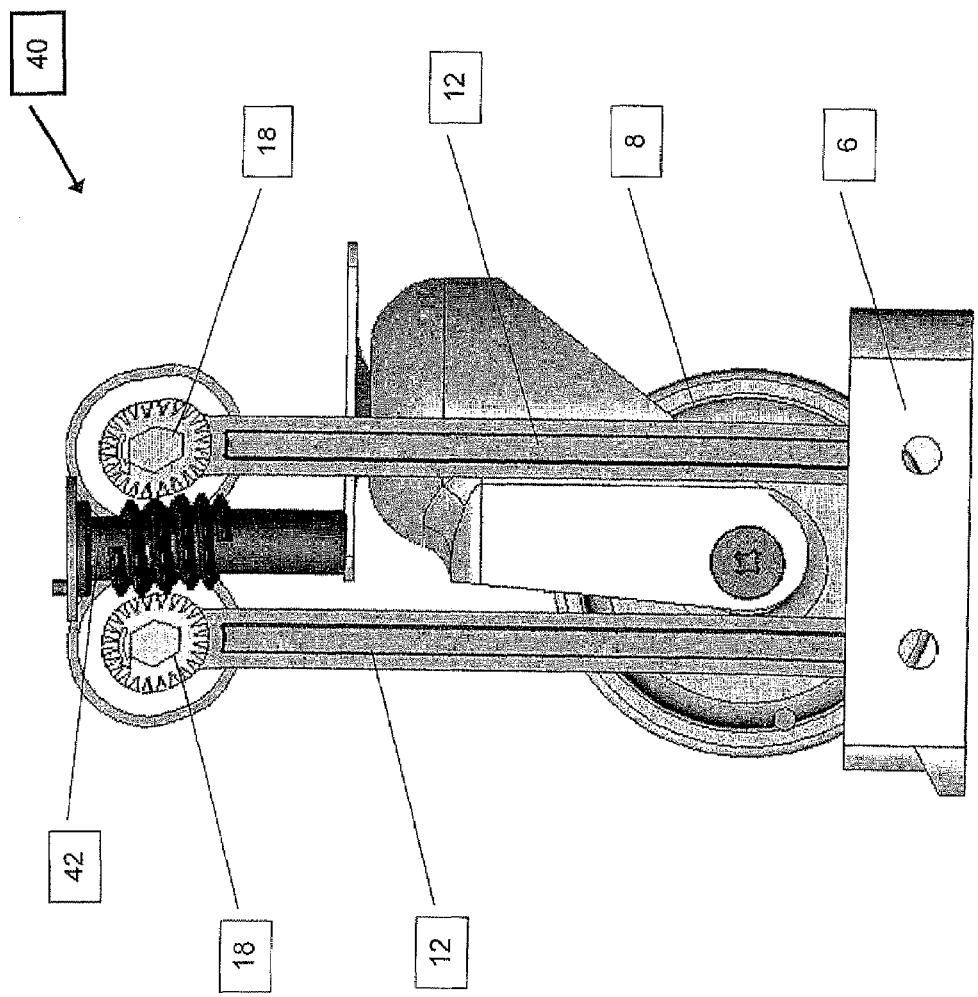
FIG. 6 is a side elevation of a variant of the displacement mechanism of FIG. 4 in which the actuating gear is a worm gear accessible from the top of the load bearing deck.
Figure 7A:
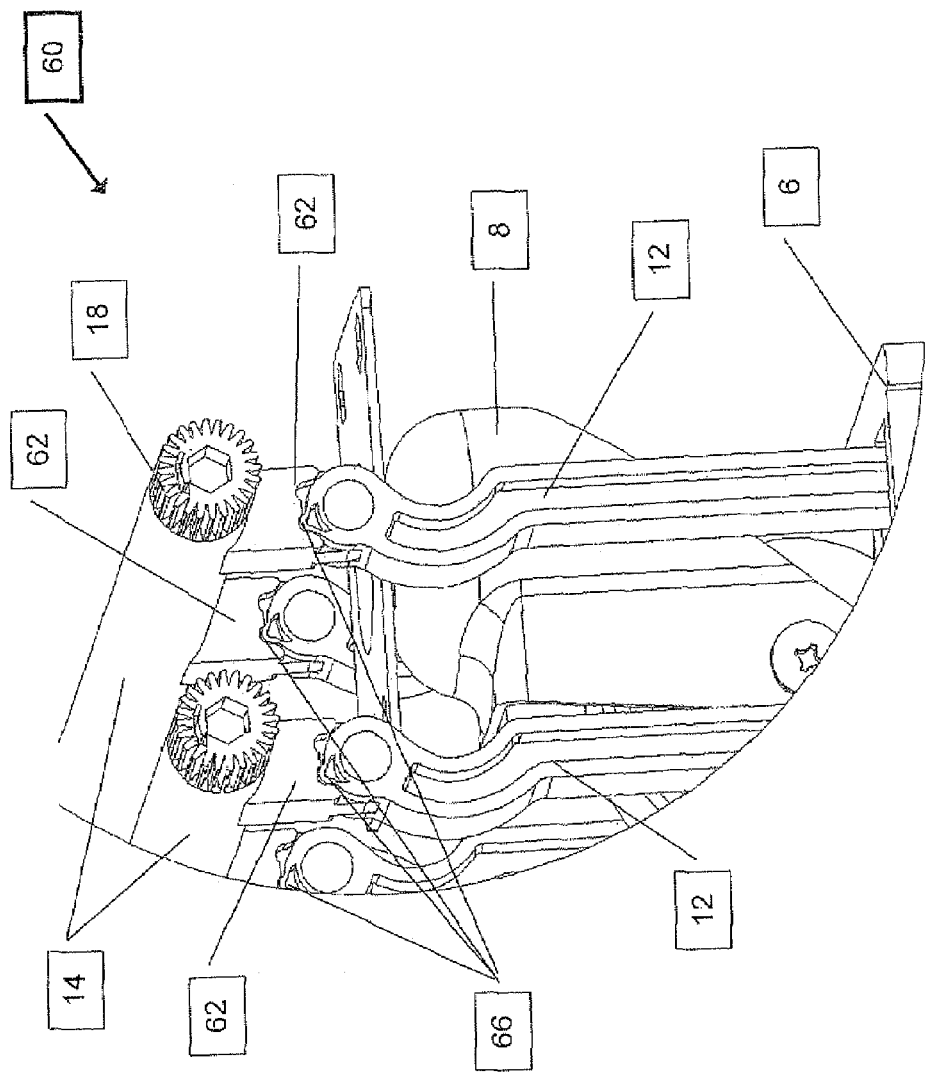
FIG. 7A is a detail of the region B in FIG. 7, the displacement mechanism is shown with the retractable support skids supporting the dolly-pallet.

FIGS. 6, 6A and 6B illustrate a variant 40 of the displacement mechanism of FIG. 4. Here, the gears 18 mesh with worm gear 42, which is accessible from the top of the load bearing deck 4. Also seen clearly in FIGS. 6A and 6B is the process by which the retractable support skid 6 is retracted and lowered along a substantially vertical path by support struts 12. The parallel support struts 12 are pivotally attached at one end to the retractable support skid 6 and at the other end to the eccentric attachment shafts 16. As illustrated in FIG. 6A, when the eccentric attachment shafts 16 are located at the bottom of their circular path, the retractable support skid 6 is in contact with the ground surface and supporting the dolly-pallet (as seen in FIG. 1). As rotating lifting bars 14 rotate (here in a counter-clockwise direction) the eccentric attachment shafts 16 retract the retractable support skid 6 along a substantially vertical path bringing the wheel elements 8 into contact with the ground surface and thereby transferring support of the dolly-pallet from the retractable support skid 6 to the wheel elements 8 (as seen in FIG. 2).

As illustrated in FIGS. 4 and 4A, as the eccentric attachment shafts 16 reach the top of their circular path, pins 22 engage the edge of support struts 12, thereby causing the support struts 12 to rotate with the rotating lifting bars 14 as they continue to rotate. This displaces the retractable support skid 6 along a substantially arcuate path up and away from the wheel elements 8, thereby allowing the wheel elements 8s freedom to swivel (as seen in FIG. 3).

It will be appreciated that the retractable support skid 6 may be brought back into contact with the ground surface and the wheel elements 8 lifted, thereby transferring support of the dolly-pallet from the wheel elements 8 back to the retractable support skid 6 (as seen in FIG. 1) by rotating the rotating lifting bars 14 in a clockwise direction and displacing the retractable support skid 6 first along a downward arcuate path toward the wheel elements 8, and then in a substantially downward vertical path to the ground surface.

A second preferred embodiment of a displacement mechanism 60 is illustrated in FIGS. 7, 7A, 7B, 8 and 8A. In this embodiment, the retractable support skid 6 is retracted and lowered along a substantially vertical path by support struts 12, which are attached to levers 62 that extend from the rotating lifting bars 14. The rotating lifting bars 14 are driven by gears 18, which in this embodiment may be driven, by either the drive gears 20 deployed on drive shaft 22 of FIG. 4, or the worm gear 42 of FIG. 6.

FIG. 7A illustrates the position of the levers 62 when the retractable support skid 6 is in contact with the ground surface and supporting the dolly-pallet (as seen in FIG. 1). As rotating lifting bars 14 rotate (here again in a counter-clockwise direction) the levers 62 retract the retractable support skid 6 along a substantially vertical path bringing the wheel elements 8 into contact with the ground surface and thereby transferring support of the dolly-pallet from the retractable support skid 6 to the wheel elements 8 (as seen in FIG. 2).

When the lifting projection 64 of the lever 62 engages the edge of support struts 12 (FIG. 7B), the support struts 12 begin to rotate with the rotating lifting bars 14 as they continue to rotate. This displaces the retractable support skid 6 along a substantially arcuate path up and away from the wheel elements 8 (FIG. 8), thereby allowing the wheel elements 8s freedom to swivel (as seen in FIG. 3).

Figure 7B:
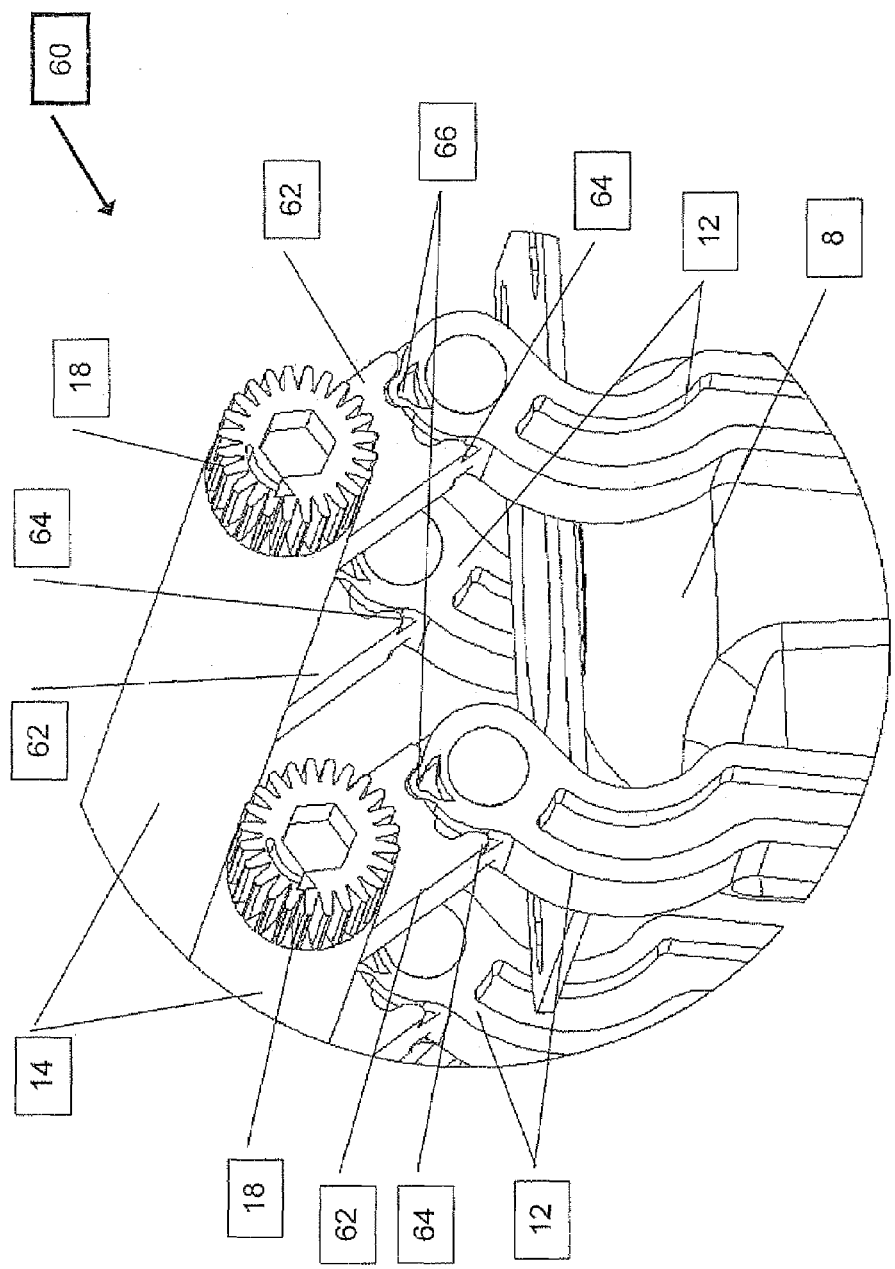
FIG. 7B is a detail of the region B in FIG. 7, the displacement mechanism is shown with the retractable support skids displaced vertically and the dolly-pallet being supported by the wheel elements.
Figure 8:
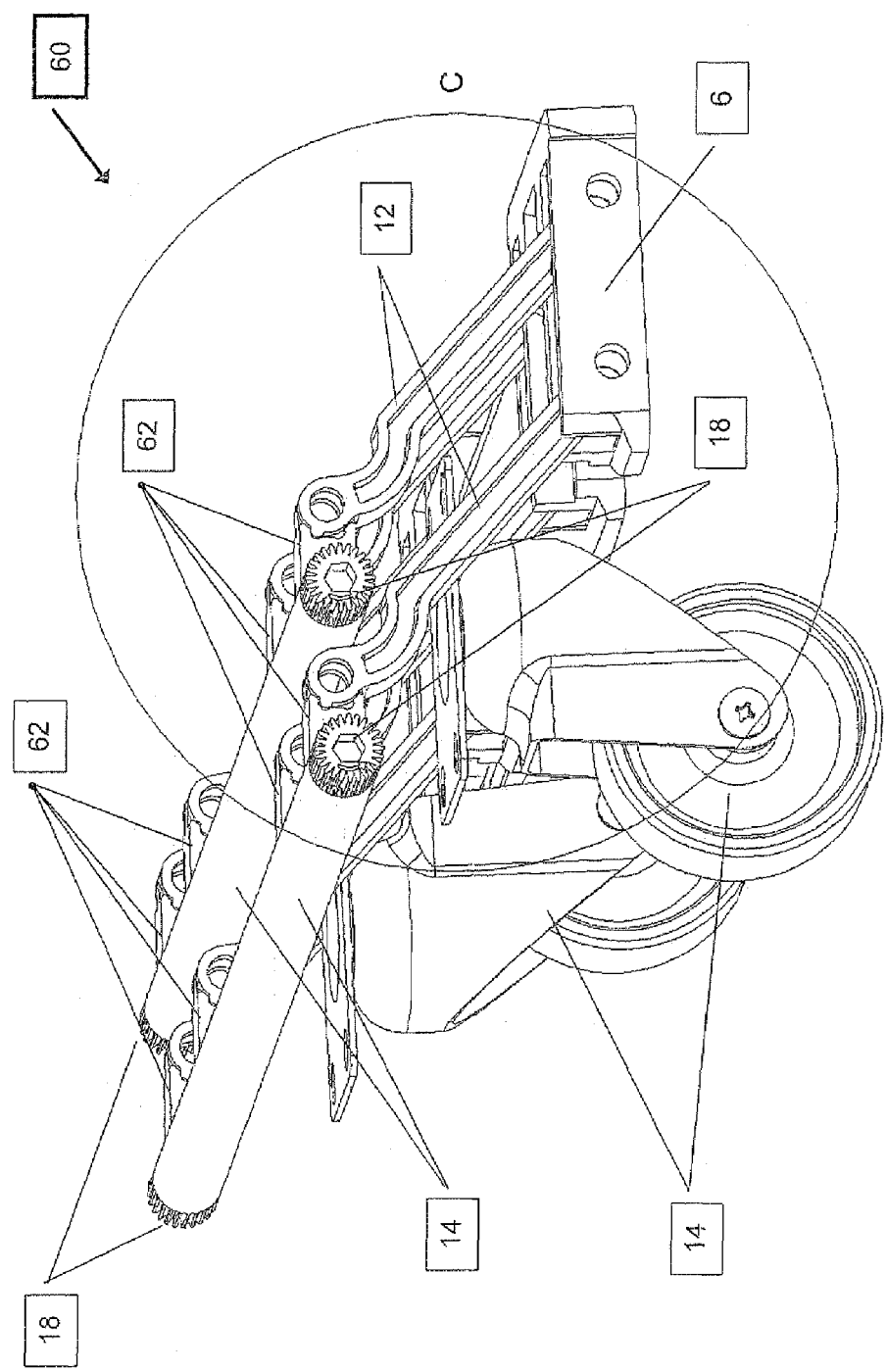
FIG. 8 is an isometric view of the embodiment of FIG. 7 showing the retractable support skid displaced along a substantially arcuate path after having been lifted vertically.
Figure 8A:
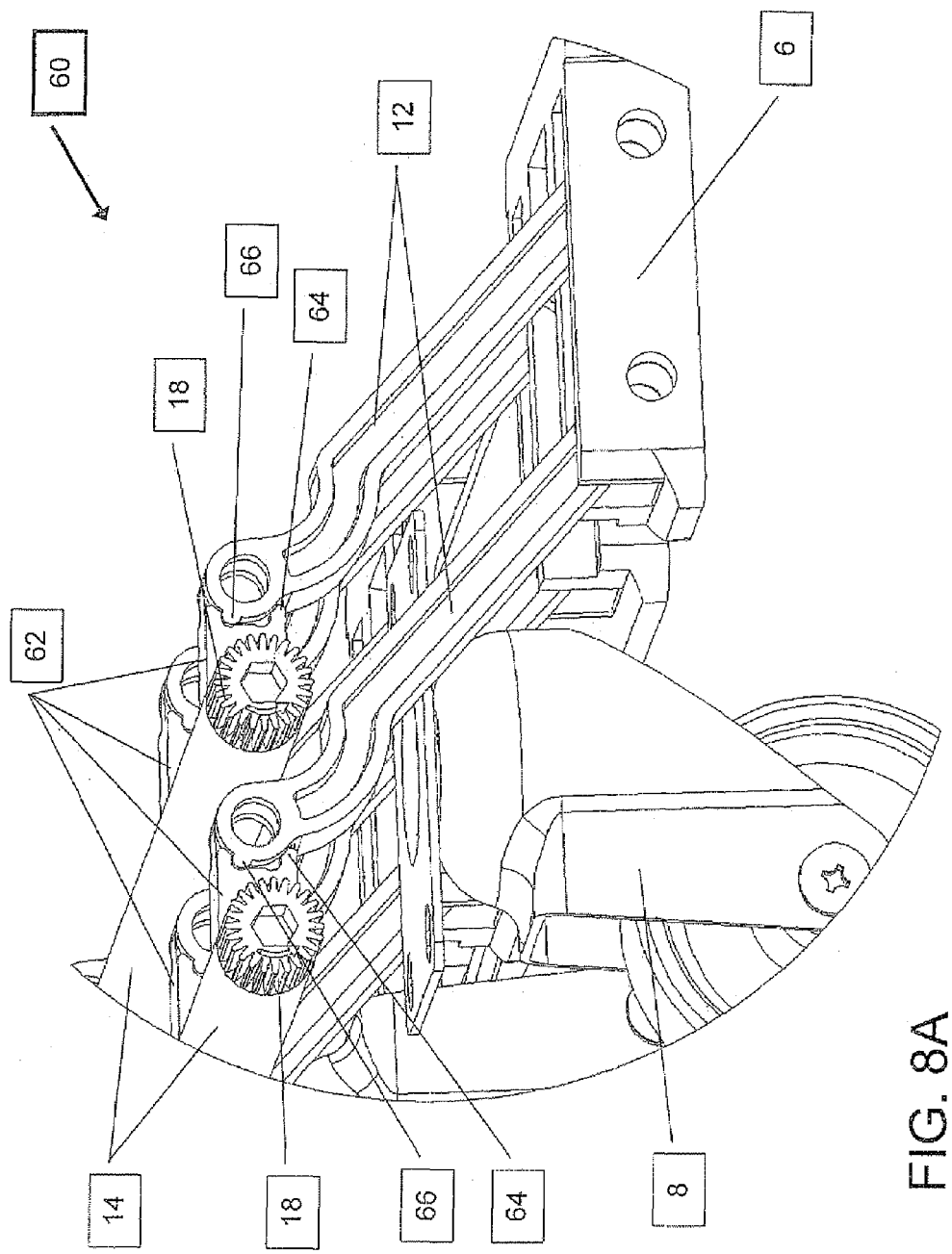
FIG. 8A is a detail of FIG. 8 for clarity.

An optional feature of the displacement mechanism of the present invention, illustrated here in this embodiment of a displacement mechanism, is the resilient snap-lock arrangement 66 associated with the pivotal interconnection of the support struts 12 and the lever 62. In a first snap-locking position, as seen in FIG. 7A, the resilient snap-lock arrangement 66 helps maintain positional alignment between the support struts 12 and the lever 62 when the skid 6 is supporting the dolly-pallet and during the displacement along the substantially vertical path. In a second snap-locking position, as seen in FIG. 7B, the resilient snap-lock arrangement 66 helps maintain positional alignment between the support struts 12 and the lever 62 during displacement of the skid 6 along the substantially arcuate path.

It will be appreciated that the retractable support skid 6 may be brought back into contact with the ground surface and the wheel elements 8 lifted, thereby transferring support of the dolly-pallet from the wheel elements 8 back to the retractable support skid 6 (as seen in FIG. 1) by rotating the rotating lifting bars 14 in a clockwise direction and displacing the retractable support skid 6 along a downward arcuate path toward the wheel elements 8, and then in a substantially downward vertical path to the ground surface.

Figure 5:
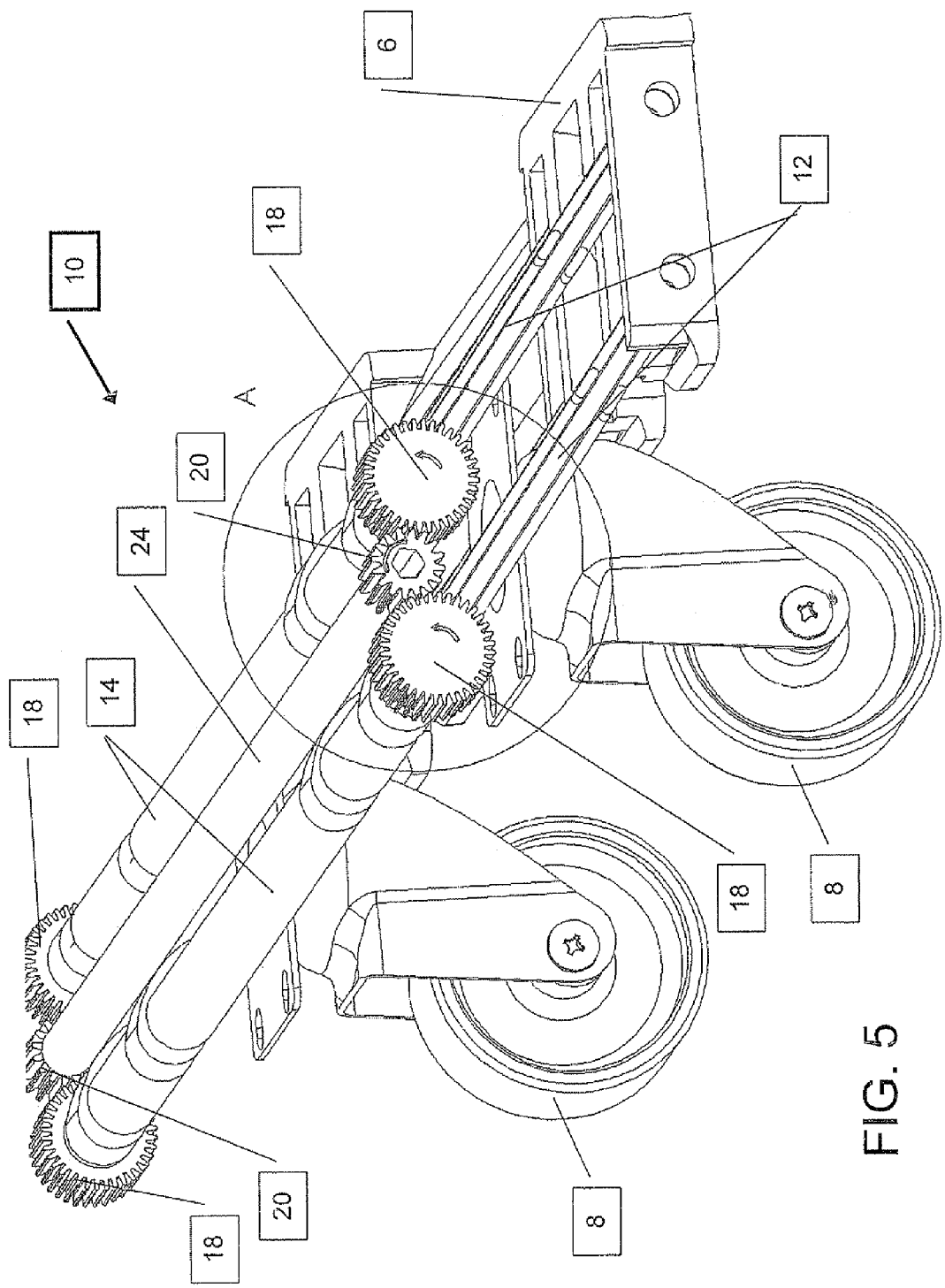
FIG. 5 is an isometric view of the embodiment of FIG. 4 showing the retractable support skids displace along a substantially arcuate path after having been lifted vertically.
Figure 13:
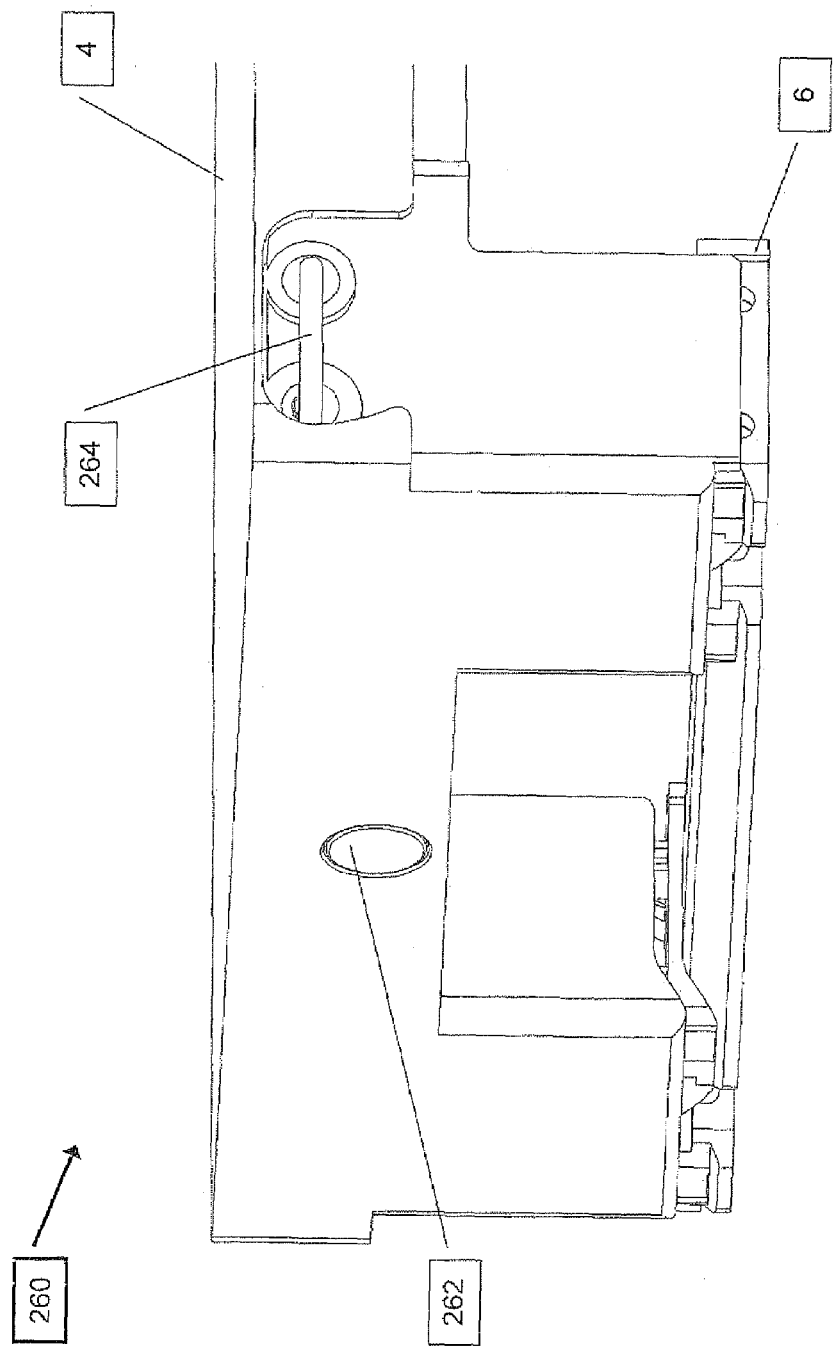
FIG. 13 is an isometric view of a "knockdown" variation of the embodiment of FIG. 7.
Figure 14:
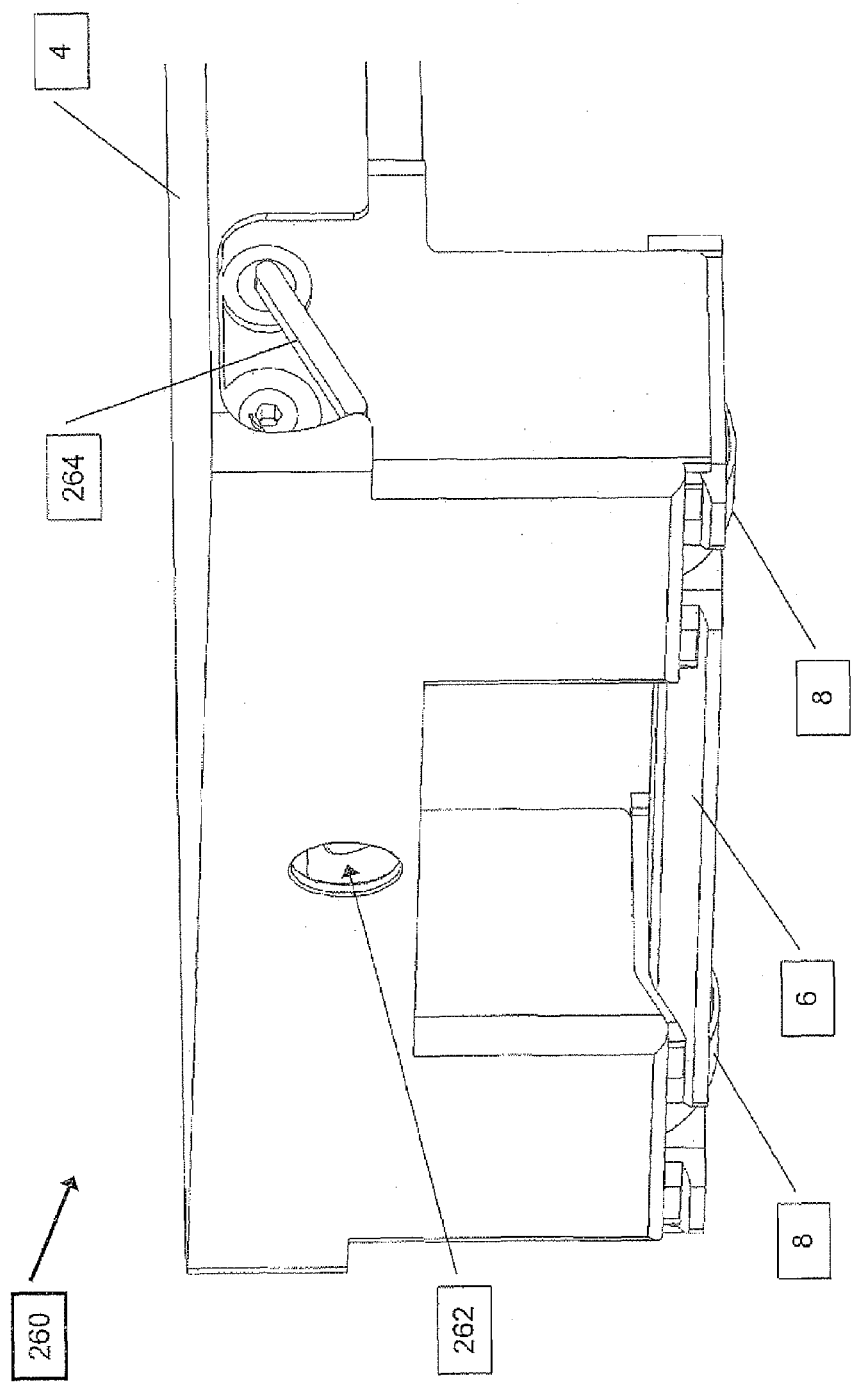
FIG. 14 is an isometric view of the embodiment of FIG. 13, after the release button has been displaced and the retractable support skid has been lifted vertically.
Figure 15:
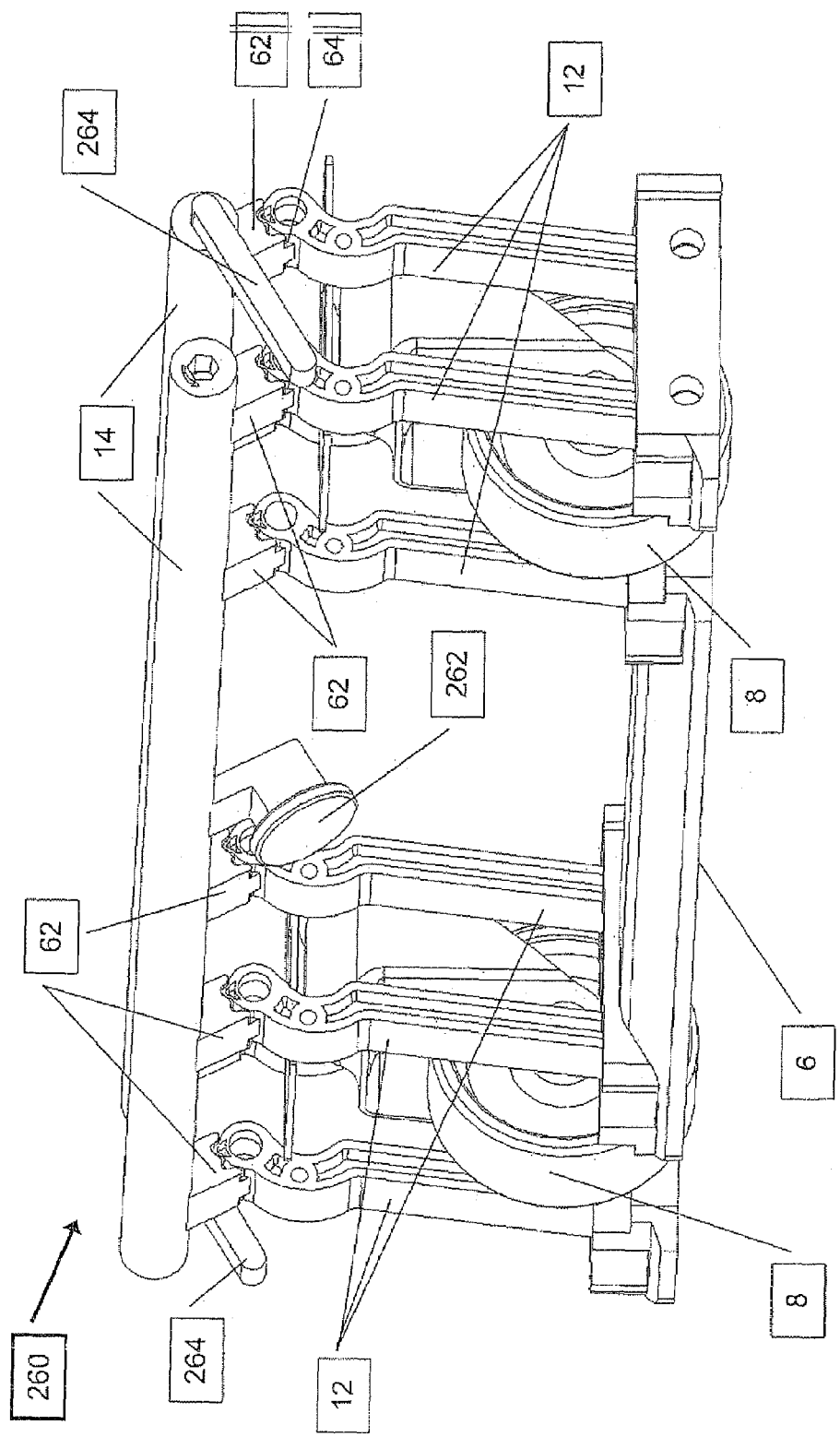
FIG. 15 is an isometric view of the displacement mechanism as deployed in FIG. 14.

A manually operated "knockdown" variation of the second preferred embodiment of a displacement mechanism 260 is illustrated in FIGS. 13-17. In this variation, the retractable support skid 6 is retracted and lowered along a substantially vertical path by support struts 12, which are pivotally attached to levers 62 that extend from the rotating lifting bars 14. The rotating lifting bars 14. In this variation, the retractable support skid 6 is initial retracted from a position of supporting the dolly-pallet (as seen in FIGS. 1 and 13) by "knocking" release button 262, which is mechanically linked to at least on of the rotating lifting bars 14, with a tool such as, but not limited to, a hammer, thereby freeing the displacement mechanism 260 from a locked position. This action also causes the release button to move laterally, causing rotation of rotating lifting bars 14, which may be mechanically linked by gears such as is illustrated in FIG. 5, thereby raising the retractable support skid 6 along a substantially vertical path bringing the wheel elements 8 into contact with the ground surface and thereby transferring support of the dolly-pallet from the retractable support skid 6 to the wheel elements 8 (as seen in FIGS. 2, 14 and 15).

Figure 16:
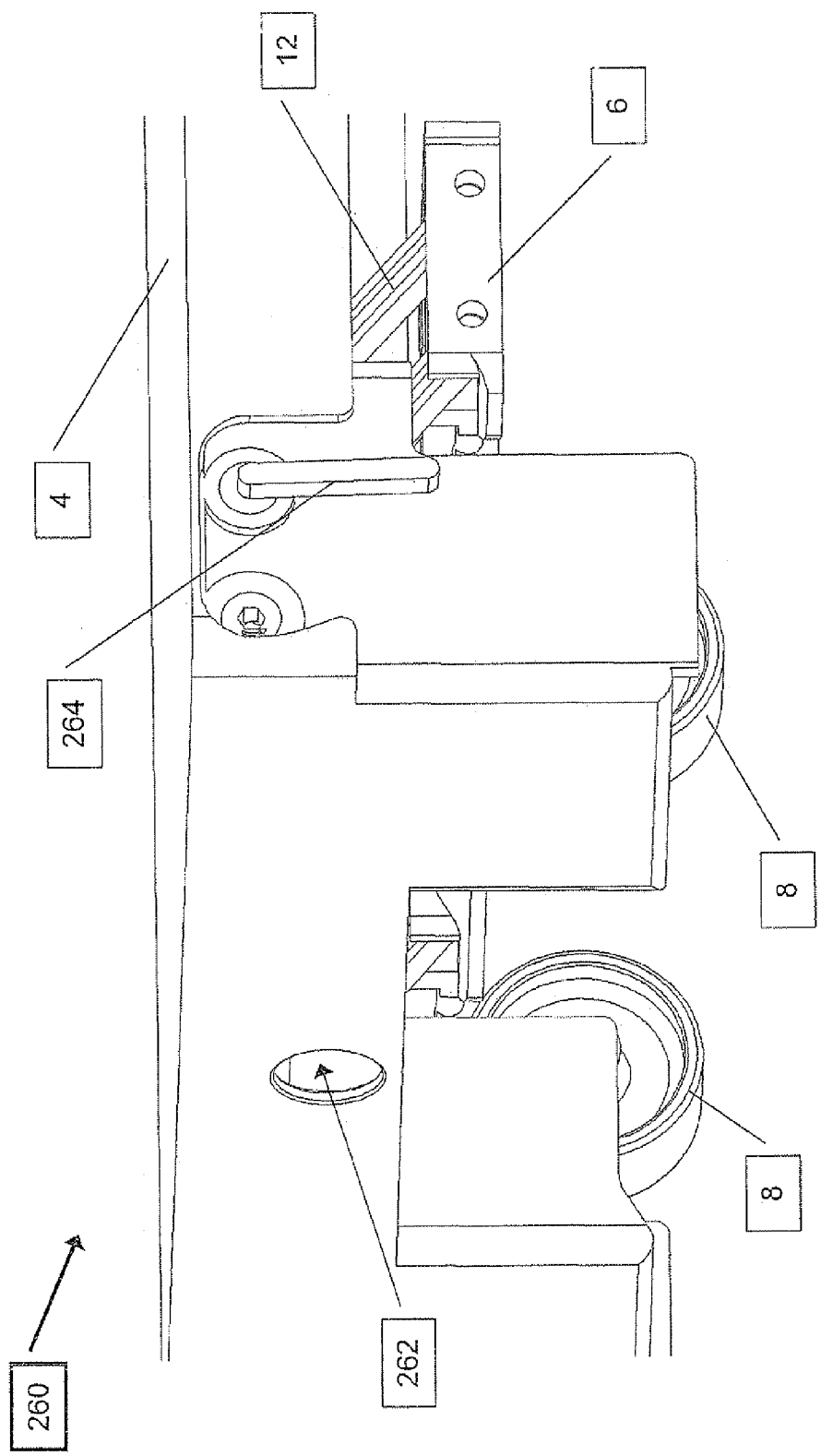
FIG. 16 is an isometric view of the embodiment of FIG. 13, after the retractable support skid has been displaced along a substantially arcuate path.
Figure 17:
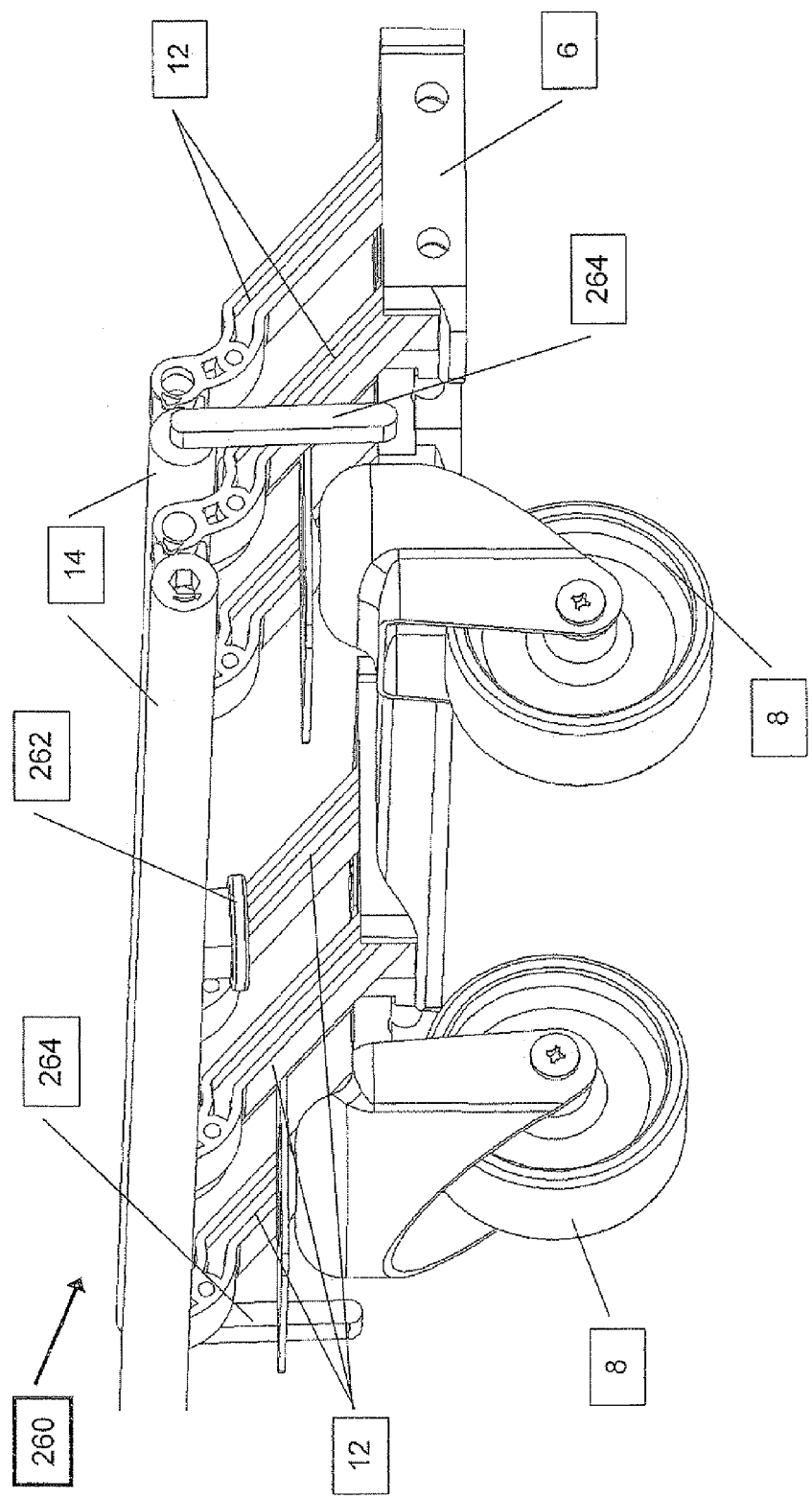
FIG. 17 is an isometric view of the displacement mechanism as deployed in FIG. 16.

Displacement of the retractable support skid 6 along a substantially arcuate path up and away from the wheel elements 8, thereby allowing the wheel elements 8 freedom to swivel (as seen in FIGS. 3, 16 and 17) is accomplished by rotating the lifting lever 264, here, in a counter-clockwise direction, thereby rotating the rotating lifting bars 14. As lifting projection 64 of the lever 62 engages the edge of support struts 12 (FIG. 17), the support struts 12 begin to rotate with the rotating lifting bars 14.

It will be appreciated that the retractable support skid 6 may be brought back into contact with the ground surface and the wheel elements 8 lifted, thereby transferring support of the dolly-pallet from the wheel elements 8 back to the retractable support skid 6 (as seen in FIGS. 1 and 13), by rotating the lifting lever 264, and therefore, the rotating lifting bars 14 in a clockwise direction and displacing the retractable support skid 6 along a downward arcuate path toward the wheel elements 8, and then in a substantially downward vertical path to the ground surface. This will also bring the release button 262 back into its original position and the displacement mechanism 260 to a locked position, as illustrated in FIG. 13.

It should be noted that FIGS. 15 and 17 illustrate two lifting levers 264 configured on opposite ends of one of the lifting bars 14. This is not intended as a limitation of the present invention, rather it is an example of one possible configuration within the scope of the present invention. It will be understood that a single lifting lever 264 would provide similar results.

Figure 9A:
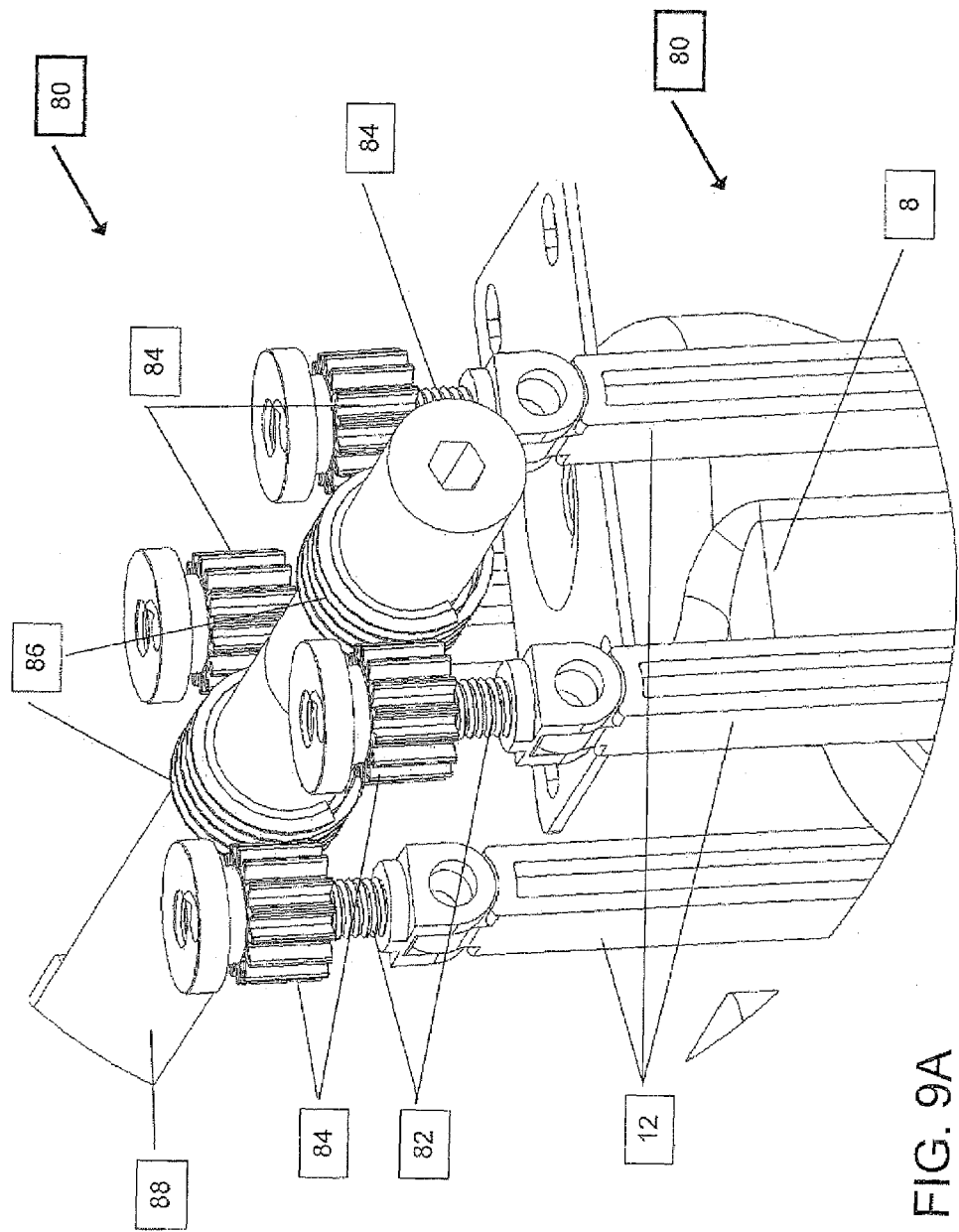
FIG. 9A is a detail of FIG. 9.

A third preferred embodiment of a displacement mechanism 80 is illustrated in FIGS. 9 and 9A. In this embodiment, the retractable support skid 6 is retracted and lowered along a substantially vertical path by support struts 12, which are attached to drive screws 82 that extend from drive gears 84, which are internally treaded such that drive screws 82 are raised and lowered by turning drive gears 84. The drive gears 84 are driven by worm gears 86 configured on drive shaft 88.

As illustrated in FIGS. 9 and 9A the retractable support skid 6 is retracted along a substantially vertical path from contact with the ground surface and supporting the dolly-pallet (as seen in FIG. 1) by rotating drive shaft 88 in a counter-clockwise direction. As the retractable support skid 6 retracts, the wheel elements 8 are brought into contact with the ground surface, thereby transferring support of the dolly-pallet from the retractable support skid 6 to the wheel elements 8 (as seen in FIG. 2). Since support struts 12 are pivotally attached to drive screws 82, the retractable support skid 6 may be displaced along a substantially arcuate path up and away from the wheel elements 8 (FIG. 8), thereby allowing the wheel elements 8 freedom to swivel (as seen in FIG. 3). This may be done manually or by any other suitable drive mechanism (not shown).

It will be appreciated that the retractable support skid 6 may be brought back into contact with the ground surface and the wheel elements 8 lifted, thereby transferring support of the dolly-pallet from the wheel elements 8 back to the retractable support skid 6 (as seen in FIG. 1) by rotating drive shaft 88 in a clockwise direction and displacing the retractable support skid 6 along a substantially downward vertical path to the ground surface.

It should be noted that load bearing deck 4 may be configured such that the drive elements, such as the drive shaft 24, rotating lifting bars 14, and the associated gears, of these first three embodiments of displacement mechanisms of the present invention may be deployed within the structure of the load bearing deck 4 itself. Alternatively, these drive elements may be attached to the underside of the load bearing deck 4.

Figure 10:
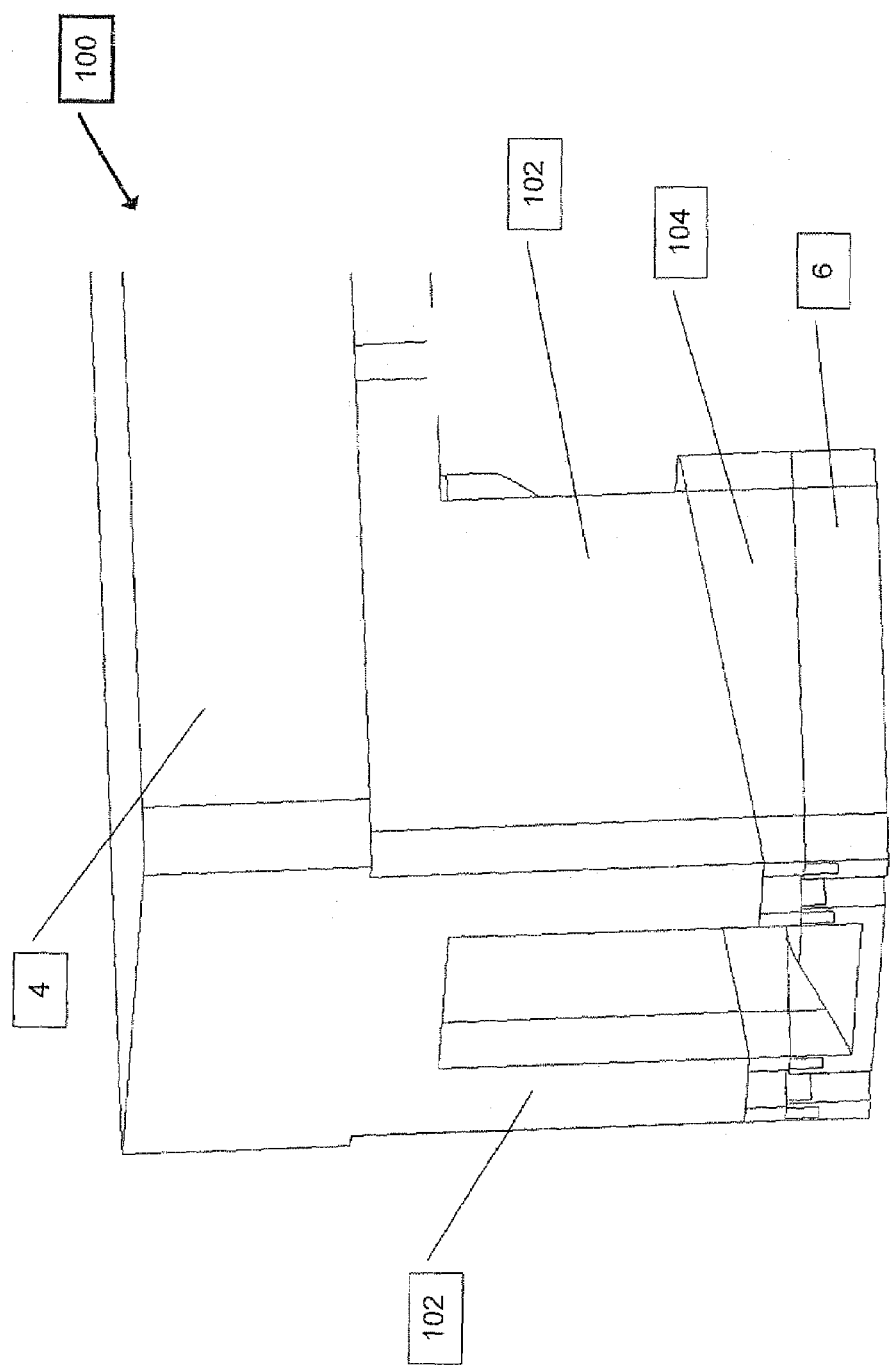
FIGS. 10-12 are isometric views of a fourth preferred embodiment of a displacement mechanism constructed and operative according to the teachings of the present invention, this embodiment utilizing slideable wedges to displace the retractable support skid.
Figure 11:
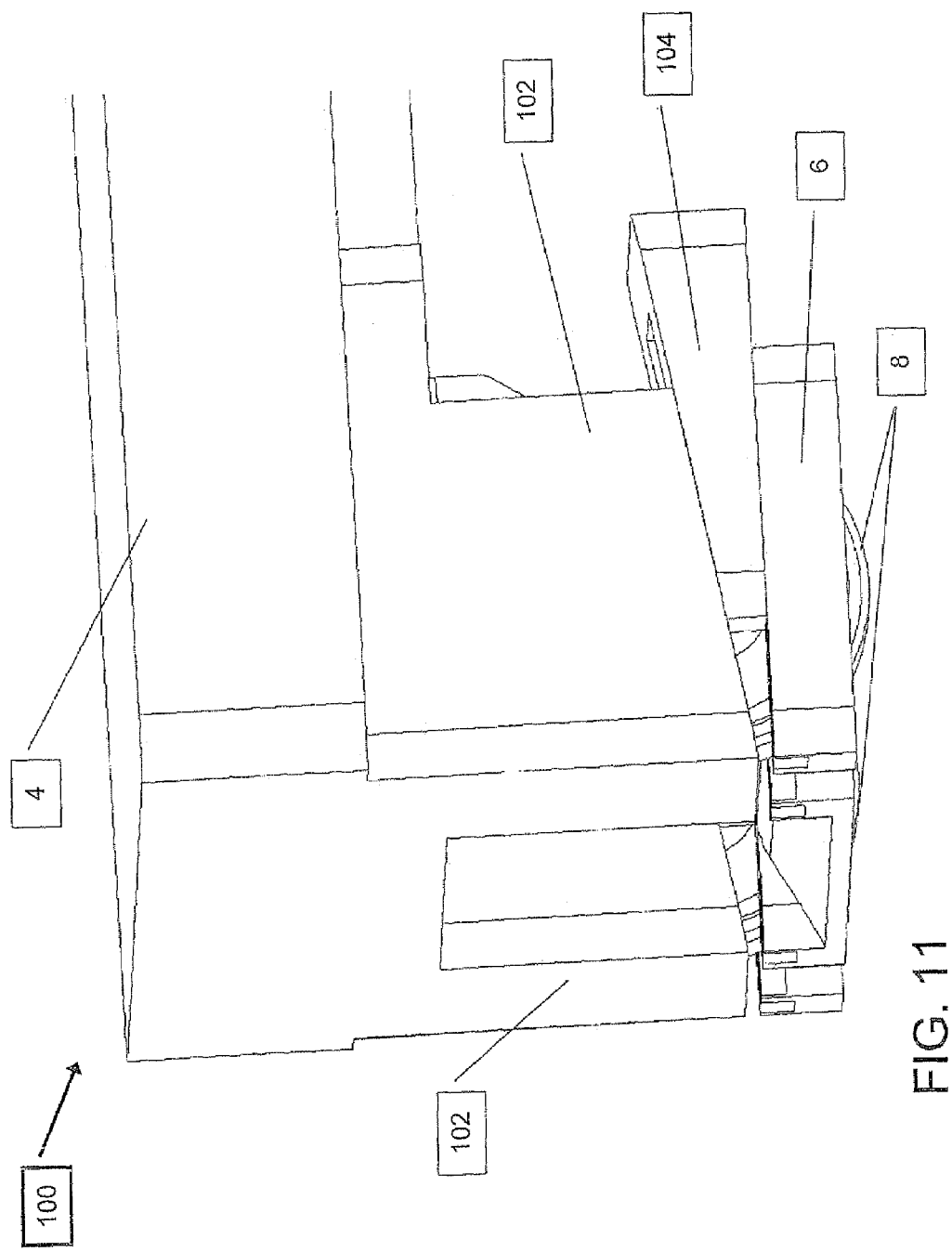
Figure 12:
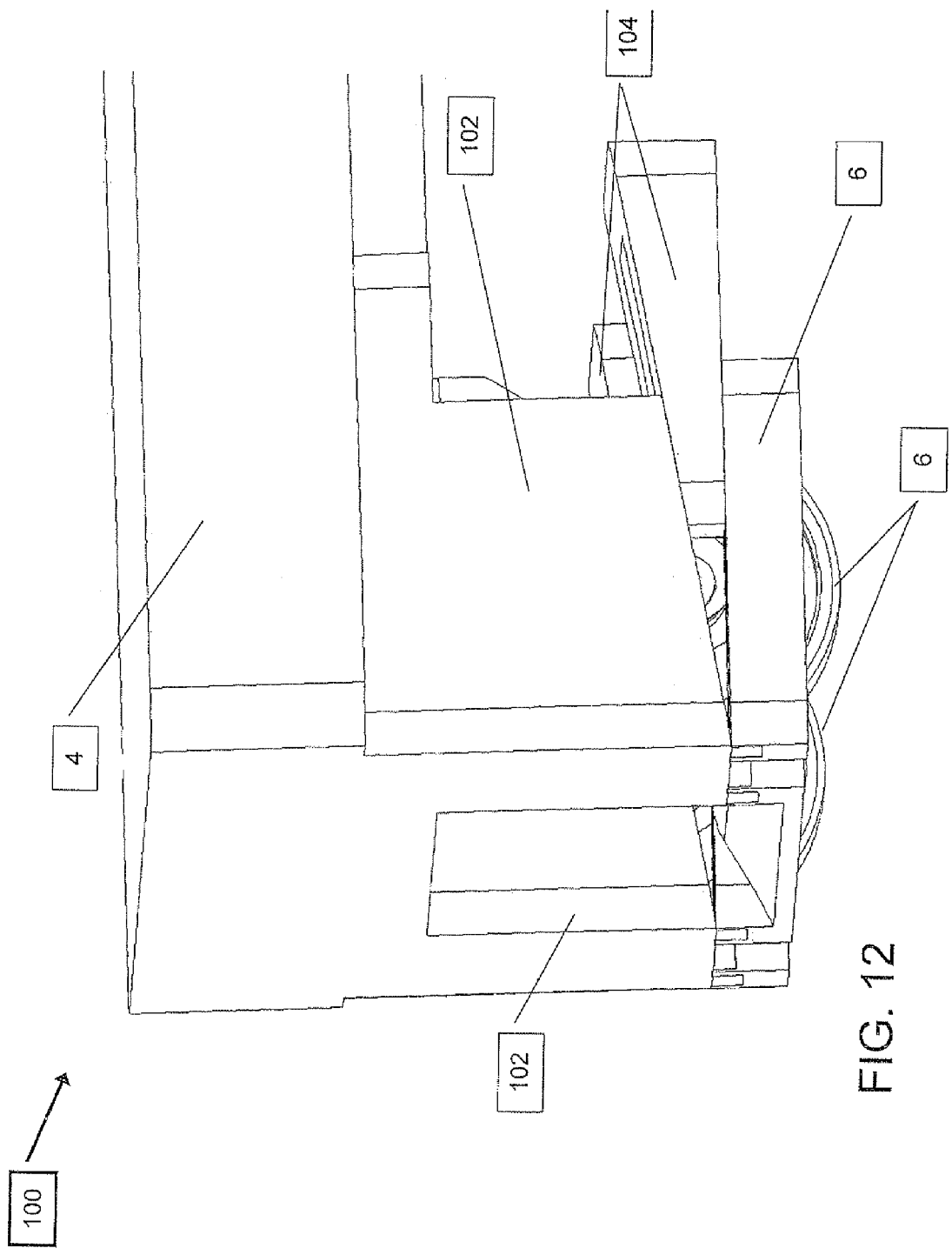

Illustrated in FIGS. 10-12 is a fourth embodiment 100 of a displacement mechanism by which the retractable support skid 6 is retracted and lowered along a substantially vertical path. In this embodiment, the retractable support skid 6 is upwardly biased toward the legs 102 that extend downwardly from the load beard deck 4 of the dolly-pallet. As seen in FIGS. 11 and 12, as wedges 104 are displace laterally, the retractable support skid 6 is drawn upward along a substantially vertical path toward the bottom surfaces of legs 102, thereby bringing the wheel elements 8 into contact with the ground surface and transferring support of the dolly-pallet from the retractable support skid 6 to the wheel elements 8.

It will be appreciated that the retractable support skid 6 may be brought back into contact with the ground surface and the wheel elements 8 lifted, thereby transferring support of the dolly-pallet from the wheel elements 8 back to the retractable support skid 6 (as seen in FIG. 1) by laterally displacing the wedges 104 back into the region between legs 102 and retractable support skid 6, thereby displacing the retractable support skid 6 along a substantially downward vertical path to the ground surface.

It should be noted that although the embodiments described herein make reference to the retractable support skid 6 as the contact surface when the dolly-pallet of the present invention is deployed in a non-rolling state, this is not intended as a limitation and a dolly-pallet configured with individual retractable contact surfaces associated with each leg is within the scope of the present invention. Further, it will be understood that directions of rotation referred to in the illustrations herein are by way of example only and that actual direction of rotation is considered to be a design consideration. Further, although the displacement mechanisms described herein are directed toward paired displacement mechanisms that are mechanically linked so as to be substantially simultaneously actuated by a common actuation linkage, this need not always be the case and individual actuation of each of the displacement mechanisms is within the scope of the present invention.

It will be appreciated that the displacement mechanism of the present invention may by driven manually or by a drive system, which may be in the form of an onboard drive system, or as a drive system accessory unit. Additionally, an onboard drive system may be activated via a control panel on the dolly-pallet, or remotely via a remote control system.

It will be appreciated that the above descriptions are intended only to serve as examples and that many other embodiments are possible within the spirit and the scope of the present invention.

What is claimed is:

1. A dolly-pallet device convertible between a pallet condition in which the device is usable as a pallet and a dolly condition in which the device is usable as a dolly, the dolly-pallet device comprising:
   (a) a deck having a length and a width;
   (b) at least two skids attached to said deck for contacting a ground surface to support said deck on the ground surface when the device is in the pallet condition, each of said skids extending along substantially the entirety of one of said length and said width; and
   (c) a set of wheels attached to said deck for supporting said deck on the ground surface when the device is in the dolly condition,
wherein said skids are movable relative to said deck to convert the dolly-pallet device between the pallet condition and the dolly condition,
and wherein said skids are formed with openings through which said wheels extend when the device is in the dolly condition.

2. The dolly-pallet device of claim 1, wherein said length is greater than said width, and wherein said skids extend parallel to said width.

3. The dolly-pallet device of claim 1, wherein said skids are attached to said deck by at least one displacement mechanism.

4. The dolly-pallet device of claim 3, wherein said displacement mechanism is configured to provide geometrical locking of said skid in the pallet condition, and to be operable to release said geometrical locking and raise said skid to provide the dolly condition.

5. The dolly-pallet device of claim 1, wherein:
   (a) each of said skids is attached to said deck by a corresponding displacement mechanism; and
   (b) said displacement mechanisms are mechanically linked so as to be substantially simultaneously operable by a common actuation linkage.

6. The dolly-pallet device of claim 1, wherein at least one of said wheels is a caster.

7. The dolly-pallet device of claim 6, wherein said skids are movable to a position in which said caster is free to swivel.

8. The dolly-pallet device of claim 7, wherein, when the device is in the dolly condition, said skids are further displaceable along a substantially arcuate path to a further retracted position.

9. The dolly-pallet device of claim 1, wherein said skids are configured such that, when the device is supported on the ground surface in the pallet condition, said wheels are clear of the ground surface.

10. The dolly-pallet device of claim 1, wherein said wheels are attached to said deck in a fixed relation.

11. A method of transporting a load, the method comprising the steps of:
   (a) providing a dolly-pallet device comprising;
      (i) a deck having a length and a width,
      (ii) at least two skids attached to said deck for contacting a ground surface to support said deck on the ground surface when the device is in the pallet condition, each of said skids extending along substantially the entire of one of said length and said width, and
      (iii) a set of wheels attached to said deck for supporting said deck on the ground surface when the device is in the dolly condition, wherein said skids are movable relative to said deck to convert the dolly-pallet device between the pallet condition and the doll condition, and wherein said skids are formed with openings through which said wheels extend when the device is in the dolly condition;

(b) with the loaded dolly-pallet device standing on the ground surface in its pallet condition, moving said skids toward said deck so as to convert the dolly-pallet device to the dolly condition; and (c) transporting the dolly-pallet and the load across the ground surface by rolling on the wheels.

12. The method of claim 11, wherein, prior to said moving, the dolly-pallet device and the load are wholly supported by the skids and the wheels are clear of the ground surface, and wherein, during said moving, the deck and the load are lowered relative to the ground surface.

13. The method of claim 11, wherein, in said moving, the skids move in a direction perpendicular to the ground surface.

14. The method of claim 11, wherein, after said moving, the skids are further retracted along an arcuate path relative to the deck.

* * * * *